Nov. 4, 1969

G. DUCOMMUN ET AL  3,477,007
ELECTRIC CURRENT LIMITER CIRCUIT FOR LIMITING ELECTRIC MOTOR TORQUE IN A TOOL
Filed March 6, 1967

INVENTORS
Georges Ducommun and Karl Adler
BY
*Emerie & Smiley*
ATTYS.

United States Patent Office 3,477,007
Patented Nov. 4, 1969

3,477,007
ELECTRIC CURRENT LIMITER CIRCUIT FOR LIMITING ELECTRIC MOTOR TORQUE IN A TOOL
Georges Ducommun, Grenchen, and Karl Adler, Feldbrunnen, Switzerland, assignors to Biviator S.A., Geneva, Switzerland
Filed Mar. 6, 1967, Ser. No. 620,915
Claims priority, application Switzerland, Mar. 18, 1966, 3,987/66; July 15, 1966, 10,324/66
Int. Cl. H02p 7/00; G05b 5/01
U.S. Cl. 318—434                   10 Claims

ABSTRACT OF THE DISCLOSURE

An electric current limiter circuit for limiting electric motor torque in a tool needing increasing torque during each operating cycle, the motor circuit being automatically opened and the motor stopped when the motor current and torque reach an upper limit value at the end of the operating cycle, and said motor circuit being automatically closed after a delay time for starting up the motor for the next operating cycle of the tool.

---

This invention relates to an electric limiter circuit, particularly for torque limitation in operating and working processes, comprising a main circuit including a circuit breaker which is automatically opened when the current flow in said main circuit exceeds a limit value. Circuits of this type are used particularly for torque limitation in operating utensiles such as screw drivers, rewinding apparatus for watches and the like. Prior devices of this kind have mechanical friction couplings between a driving motor and the instrument driven by the same. However, such a friction coupling has many disadvantages. It is difficult to so design a mechanical friction coupling that the limit torque transmitted by the same remains constant for longer periods of operation. It is difficult to adjust the desired torque. The motor may only be started and stopped manually, the result of this being that for instance a screw driver is already started before it is engaged with the screw and that the screw driver is often disengaged from the screw when the motor is still running and the full torque is transmitted to the screw driver. With this manner of operation screw heads may be scratched or even considerably damaged.

In other prior screw drivers or other similar tools a circuit breaker is connected into the circuit of the driving motor, this circuit breaker being opened whenever the current in the motor circuit reaches a predetermined limit value, whereby the motor is deenergized when its torque has reached a predetermined value corresponding to the said limit current. However, all these devices require manual starting up of the motor.

This invention aims in removing all these disadvantages of prior devices. The circuit according to this invention broadly comprises a monostable control circuit adapted to control said circuit breaker for automatically closing it with a predetermined delay whenever it has been opened.

When the circuit breaker is opened the torque decreases to zero and remains zero during the said delay period wherby scratching or other damaging of the screw is prevented. The delay may be adjusted to a suitable value equal to the time usually required for the manipulations to be effected between succeeding operations, for instance between tightening of two screws or rewinding of two watches, so that the screw driver or rewinding device is automatically started up when it is needed for the next operation, for instance when a new screw has been put onto the screw driver and when the same is thus prepared for inserting and tightening the new screw.

Two embodiments of the limiter circuit according to this invention for use in a screw driver will now be explained with reference to the accompanying drawings.

Figure 1:
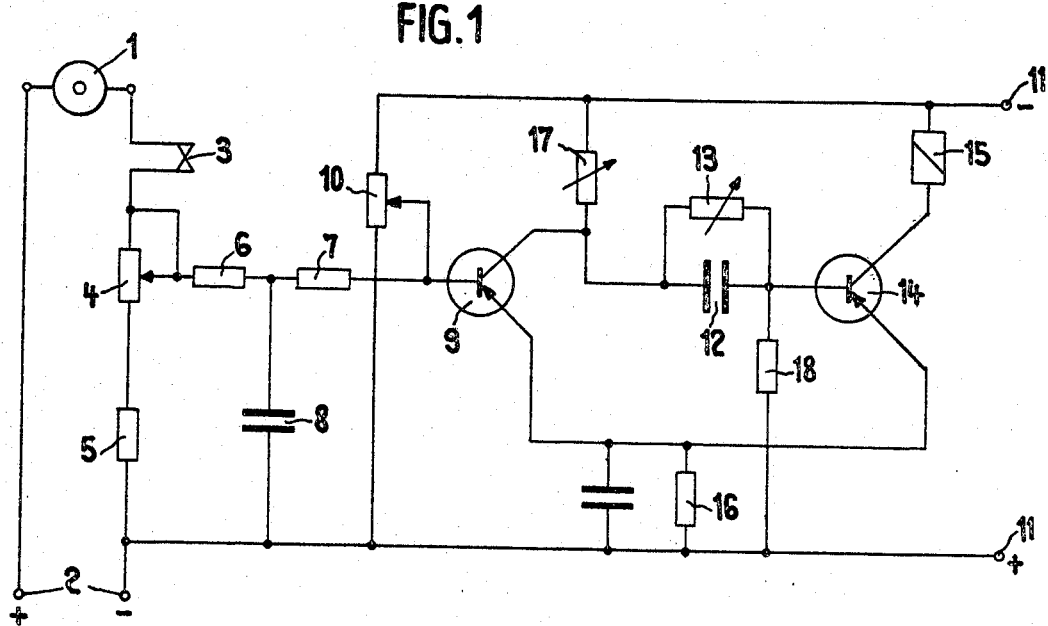

In the circuit schematically shown in FIG. 1, the driving motor 1 of the screw driver may be energized from a direct current source of which terminals 2 are illustrated. A circuit breaker 3, a variable resistor 4 and a constant resistor 5 are connected into the motor circuit. In the operating condition shown in the figure the circuit breaker is closed. The tapping of the variable resistor 4 is connected to the base of an input transistor 9 through resistors 6 and 7. A condenser 8 is connected to the conductor between resistors 6 and 7. The base of transistor 9 is also connected to the tapping of a high-ohmic voltage divider 10 connected to the terminals 11 of a stabilized source for the circuit. The collector of the input transistor 9 is connected to the base of an output transistor 14 through the parallel connection of a condenser 12 and a relatively high-ohmic resistor 13. A relay winding 15 adapted to operate the circuit breaker 3 is connected into the collector circuit of the output transistor 14. The emitters of both transistors 9 and 14 are energized through a resistor 16. Further, an adjustable resistor 17 is connected into the collector circuit of the input transistor 9. The base of output transistor 14 is connected to the positive terminal of the source through a resistor 18.

As already set out, the circuit is illustrated in its operating condition in which the motor 1 is energized through the circuit breaker 3. The motor current flows through resistors 4 and 5 wherein a voltage drop corresponding to the motor current is produced. As long as the screw is only screwed into a nut a threaded portion of a piece the torque required for turning it is relatively small and the current in the motor circuit is relatively weak. Therefore, a small voltage drop is produced in resistors 4 and 5 so that the base of transistor 9 is maintained at a negative potential and this transistor is in conducting state. The output transistor 14 is cut off and since no current flows in winding 15 the circuit breaker which is a rest contact of the relay is closed. When the screw is now tightened, the torque and the current flow in the motor increase whereby the voltage drop at resistors 4 and 5 increases. Therefore, the voltage at the base of transistor 9 changes towards positive values until the transistor 9 is cut off when the base potential reaches a predetermined threshold value. Due to the sudden voltage drop at the collector of transistor 9 the output transistor 14 turns conducting and the energized winding 15 opens the circuit breaker 3 so that the motor is deenergized. The part of the circuit comprising transistors 9 and 14 is a monostable multivibrator which will now remain in this condition for a predetermined time independently of the reduction of the voltage drop in resistors 4 and 5 upon deenergization of the motor. In accordance with the ratio between resistors 13 and 18 and the capacity of condenser 12 the voltage at the base of transistor 14 increases until this transistor is cut off again and the transistor 9 turns conducting due to the potential increase at its emitter. By this reversal of the multivibrator at the end of a period adjustable by means of resistor 13 the circuit breaker 3 and the motor 1 are closed again. The delay in reclosing the circuit breaker 3 is adjusted to such a value that it is at least possible to disengage the screw driver from the screw without torque. However, as mentioned above, the delay period may be so adjusted that the screw driver may be disengaged and equipped with another screw before the motor is restarted. Therefore, the operator has nothing to do with starting and stopping of the motor and the motor will always be cut out for exactly the same motor current and for exactly the same limit torque.

The circuit shown in FIG. 1 is entirely suitable when the ratio between the idle torque and the limit or maximum torque for which the motor is cut out, is relatively considerable. Under these conditions there is no danger that prematured cutting out of the motor occurs due to disturbance peak potentials. However, when the limit or maximum torque of the screw driver should be variable within a wide range in such a manner that maximum or limit torques should be adjustable which only slightly exceed the idle-running torque, the filter action of the condenser 8 shown in FIG. 1 is no longer sufficient and additional means are required for preventing unintentional prematured reversal of the multivibrator by disturbance potentials, for instance by the peak current during starting of the motor.

Figure 2:
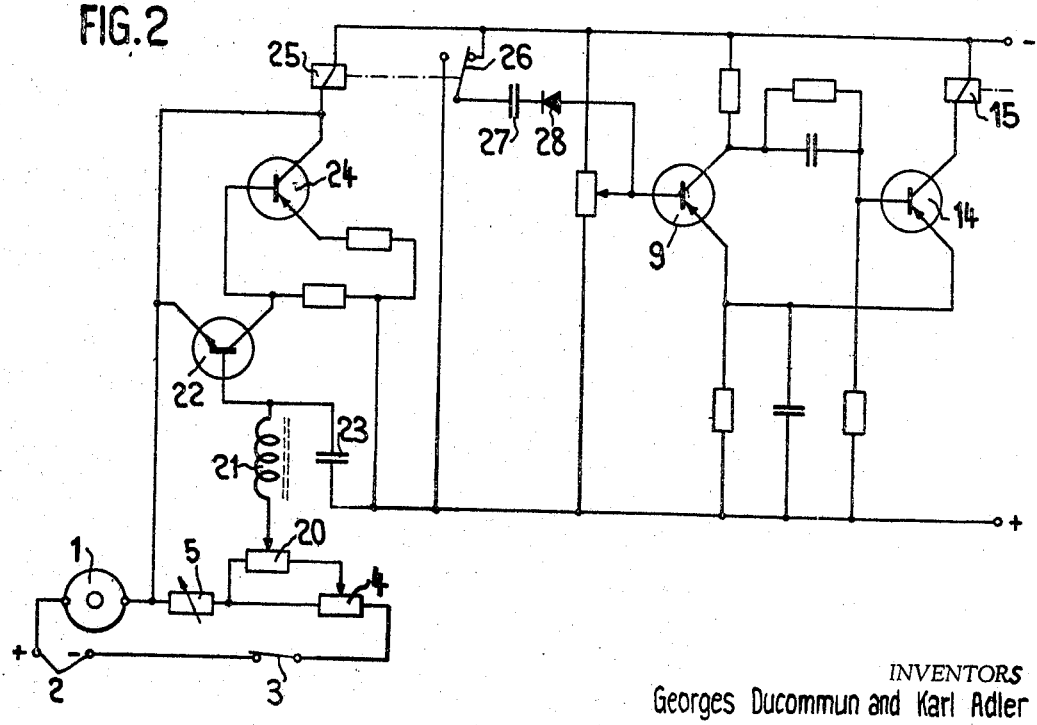

An embodiment including such additional means is shown in FIG. 2 wherein the multivibrator is controlled by contacts of a relay. Corresponding elements are only partly designated in FIG. 2 and have the same purpose as explained with reference to FIG. 1.

A potentiometer 4 and a resistor 5 are connected into the circuit of the driving motor 1 connected to a direct current source 2. The tapping of the potentiometer 4 serving for coarse adjustment, is connected to a further potentiometer for fine adjustment, of which the tapping is connected to the base of an input transistor 22 through a choke 21. A filter condenser 23 is connected to choke 21. The transistor 22 is directly coupled with a transistor 24 comprising a relay winding 25 in its collector circuit. The relay 25 has a reversing switch 26 which is in the position shown in the drawing in connection with the negative terminal of a source when the relay is deenergized. When the relay is energized the switch is reversed to the positive terminal of the source. Switch 26 is connected to the base of the input transistor 9 through a condenser 27 and a diode 28. The output transistor 14 of the multivibrator is connected to the relay 15 operating the circuit breaker 3. The other elements of the multivibrator correspond to those shown in FIG. 1.

The circuit is shown in its normal operating condition, that is, the motor circuit is closed and it is assumed that the motor 1 operates under idling conditions, when the screw has not yet been tightened. Under these conditions the motor current is relatively weak and the tapping of the potentiometer 20 has a slightly negative potential relatively to the emitter of transistor 22. Accordingly a relatively weak current flows in the transistor 22 and the current flow in transistor 24 is also weak so that the relay 25 is deenergized. Contact 26 is in its position shown in FIG. 2 and contacts the negative terminal of the source, whereby transistor 9 is conducting and transistor 14 is cut off. The relay 15 is deenergized and its rest contact 3 closes the motor circuit. Disturbing voltage peaks produced by the motor or any other noise voltages are filtered off by the choke 21 and the condenser 23. Current peaks of short duration that may flow in the relay 25 are without effect because the relay will not respond to current pulses of extremely small duration. When the screw is tightened the torque to be produced by the motor 1 increases whereby the current flow in the motor circuit in transistors 22 and 24 increases accordingly until the current flow in relay 25 becomes sufficient for reversing contact 26 when a limit motor current predetermined by the adjustment of potentiometers 4 and 20 is attained. By the reversal of contact 26 a sudden change of the charge at condenser 27 occurs and the voltage at the base of transistor 9 increases to a value for which this transistor is cut off. As explained above the transistor 14 now turns conducting and the so energized relay 15 cuts the motor circuit with its rest contact 3. The voltage at the base of the input transistor 22 drops to zero so that the output transistor 24 is also practically cut off and the relay 25 is deenergized. The contact 26 returns into the position shown in the drawing, but no reversal of the multivibrator is released thereby. The multivibrator is only reversed at the end of a period substantially determined by the time constant of the base circuit of transistor 14, whereby the relay 25 is deenergized and closes the motor circuit with its contact 3. The starting current pulse of the motor 1 is not sufficient for energizing relay 25 so that the circuit has returned to the normal idling condition as illustrated and as explained above.

Control of the multivibrator through condenser 27 has the advantage that a pulsewise control directly by means of the positive and negative potentials of the source is possible. The diode 28 has the effect that reversal of the multivibrator only occurs when the contact 26 is reversed to the positive terminal of the source, but not when it is reversed back to the negative potential.

The series resistor 5 of the motor circuit has the effect that even with erroneous adjustment of both potentiometers 4 and 20 to zero sufficient voltage drop is produced at resistor 5 for energizing relay 25 and for breaking the motor circuit when the motor 1 is completely stopped and the motor current rises to a maximum.

Instead of the filter means comprising a choke and a condenser as shown, any other filter, for instance a filter having a number of filter sections, may be used. The relay 25 may have delayed operation or delayed release if desired.

Of course other monostable circuits may be used for determining the delayed closure of the motor circuit. As an example, a relay having its winding connected into the motor circuit and having a rest contact connected into the motor circuit may be used when low precision is required, the delayed closure of the motor circuit being obtained by delayed closure of the rest contact of the relay.

The field of application of the circuit is not limited to screw drivers, but other mechanical tools or other devices may be operated by a similar circuit. As an example, it is often desired to rewind a number of watches to the same degree for testing the watches. For this purpose a circuit exactly as described above with reference to a screw driver may be used wherein the screw driver is replaced by a coupling adapted to be applied against the rewinding crown of a watch. Whenever a watch has been rewound to the desired degree the motor is cut out and remains inoperative until the coupling is applied against the rewinding crown of the next watch. The duration of the motor shut-down may be adapted to the particular type of work, for instance to the time necessary for removing one watch from the coupling of the device and applying another watch. The circuit may also be used in treating machines and machine tools for limiting the torque or other forces, for instance for twisting wires, yarns and the like.

What is claimed:
1. An electric current limiter circuit for limiting electric motor torque in an electric tool needing an increasing torque during each of its operating cycles, comprising an electric driving motor, a motor circuit and a circuit breaker in said motor circuit, a monostable control circuit having an adjustable relaxation period and adapted to control said circuit breaker, adjustable resistor means in said motor circuit for producing a voltage drop in accordance with the motor current and the adjusted value of said resistor means, an input of said control circuit being connected to said resistor means for control of said control circuit by said voltage drop, an initial low-current and low-torque condition at the beginning of each operating cycle for which said control circuit is in operating condition with said circuit breaker closed and an upper limit-current and limit torque condition at which said control circuit is released into an off condition with said circuit breaker open and said motor shut down, and said monostable control circuit returning into its operating condition after said adjusted relaxation period thereby starting the motor for the next operating period of the tool.

2. A circuit according to claim 1, comprising a monostable multivibrator for control of said circuit breaker, the input of said multivibrator being controllable by the current flow in said main circuit.

3. A circuit according to claim 2, comprising a relay winding for said circuit breaker connected to the output of said multivibrator.

4. A circuit according to claim 2, comprising a relay controllable by said motor circuit, said multivibrator being controllable by contacts of said relay.

5. A circuit according to claim 4, comprising at least one electric filter circuit between said motor circuit, for instance the circuit of an electric motor, and the said relay.

6. A circuit according to claim 4, comprising a reversing switch connected to the base of an input transistor of the multivibrator, the reversing switch being adapted to be connected to opposite potentials.

7. A circuit according to claim 6, comprising a diode connected between said base and the reversing switch.

8. A circuit according to claim 7, comprising a coupling condenser series-connected with said diode.

9. A circuit according to claim 5, wherein said filter circuit comprises a series choke and a parallel condenser.

10. The use of a tool including a current limiter circuit as claimed in claim 1, wherein the tool automatically stopped at the end of each operating cycle is prepared for the next operating cycle during a waiting time determined by the said relaxation period of the multivibrator, this relaxation period being adjusted in accordince with the time required for preparing the tool, and the tool being then used for the next operating cycle after automatic restarting thereof.

References Cited
UNITED STATES PATENTS

| 2,431,316 | 11/1947 | Dudley | 318—434 |
| 2,810,778 | 10/1957 | Manty | 318—484 |
| 2,987,632 | 6/1961 | Milford | 307—273 |
| 2,992,640 | 7/1961 | Knapp | 307—273 |
| 3,017,524 | 1/1962 | Koletsky | 307—273 |
| 3,229,182 | 1/1966 | Kubler | 318—331 |

ORIS L. RADER, Primary Examiner

ALFRED G. COLLINS, Assistant Examiner

U.S. Cl. X.R.

318—459, 484